United States Patent
Tustaniwskyj et al.

(10) Patent No.: US 6,412,551 B1
(45) Date of Patent: Jul. 2, 2002

(54) SYSTEM FOR REGULATING THE TEMPERATURE OF IC-CHIPS WITH A FLUID WHICH IS HEATED AND COOLED AS A FUNCTION OF THE FLUID TEMPERATURES TO AND FROM HEAT EXCHANGERS FOR THE IC-CHIPS

(75) Inventors: Jerry Ihor Tustaniwskyj, Mission Viejo; James Wittman Babcock, Escondido, both of CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/574,784

(22) Filed: May 19, 2000

(51) Int. Cl.[7] ............................ G05D 23/00; H05B 1/02
(52) U.S. Cl. ...................... 165/264; 165/299; 165/300; 219/494
(58) Field of Search .................................. 165/264, 265, 165/80.4, 299, 300, 263, 294; 219/494; 62/113, 513

(56) References Cited

U.S. PATENT DOCUMENTS

| | | | | |
|---|---|---|---|---|
| 4,495,777 A | * | 1/1985 | Babington | 165/299 X |
| 5,123,478 A | * | 6/1992 | Hosaka | 165/299 X |
| 5,332,884 A | * | 7/1994 | Bailey | 219/494 |
| 5,333,676 A | * | 8/1994 | Mizuno | 165/294 |
| 5,348,076 A | * | 9/1994 | Asakawa | 165/294 X |
| 5,395,451 A | * | 3/1995 | Triculis | 165/299 X |
| 5,400,609 A | * | 3/1995 | Sjoholm et al. | 62/113 |
| 5,435,379 A | * | 7/1995 | Moslehi et al. | 165/80.4 |
| 6,182,742 B1 | * | 2/2001 | Takahashi et al. | 165/80.4 X |

* cited by examiner

*Primary Examiner*—Ljiljana Ciric
(74) *Attorney, Agent, or Firm*—Charles J. Fassbender; Mark T. Starr; Lise A. Rode

(57) ABSTRACT

A temperature control system comprises a reservoir that is holding a hot fluid; a heat exchanger, for an electronic component, coupled to an input conduit that carries the hot fluid from the reservoir into the heat exchanger; an output conduit coupled to the heat exchanger, that carries the hot fluid from the heat exchanger back to the reservoir; a first temperature sensor, coupled to the input conduit; and a second temperature sensor, coupled to the output conduit. A heater is coupled to the output conduit which adds heat to the hot fluid in the output conduit in response to a heater control signal; and a cooler is coupled to the reservoir which adds cold fluid to the reservoir in response to a cooler control signal. A temperature controller generates the heater control signal and the cooler control signal as respective functions of both sensed temperatures.

11 Claims, 8 Drawing Sheets

FIG. 3 eq.1 → $e_{IN}(n) = T_{IN}(n) - T_{sp}$ eq.2 → $e_{OUT1}(n) = T_{OUT}(n) - T_{sp}$ eq.3 → $e_{OUT2}(n) = T_{OUT}(n) - T_{IN}(n) + T_{OFF}$ eq.4 → if $e_{IN}(n) < -3.0°C$, then $S_{HOT}(n) = 10V$ and $S_{COLD}(n) = 0V$ eq.5 → if $e_{IN}(n) > 3.0°C$, then $S_{HOT}(n) = 0V$ and $S_{COLD}(n) = 10V$ eq.6 → else; vary $S_{HOT}(n)$ and $S_{COLD}(n)$ between $0V$ and $10V$ as follows:

$$S_{HOT}(n) = \frac{-10V}{q\max}\left\{\rho C p Q \max(e_{OUT1}(n)) + Kp\left[e_{IN}(n) + Kd\frac{d}{dt}e_{IN}(n) + Ki\int e_{IN}(n)\right]\right\} \leftarrow 51$$

$$S_{COLD}(n) = \frac{10V}{Qc\max}\left\{\frac{\rho C p Q \max(e_{OUT2}(n)) + Kp\left[e_{IN}(n) + Kd\frac{d}{dt}e_{IN}(n) + Ki\int e_{IN}(n)\right]}{\rho C p(T_{SP} - T_{CR}(n))}\right\} \leftarrow 52$$

FIG 7 eq.10 → $A_F(n) = \dfrac{12(\Delta t)A(n) + \tau[48A(n-1) - 36A(n-2) + 16A(n-3) - 3A(n-4)]}{12(\Delta t) + 25\tau}$ eq.11 → $\dfrac{d}{dt}e_{IN}(n) = \dfrac{25e_{IN}(n) - 48e_{IN}(n-1) + 36e_{IN}(n-2) - 16e_{IN}(n-3) + 3e_{IN}(n-4)}{12(\Delta t)}$ eq.12 → $\int e_{IN}(n) = [\int e_{IN}(n-1)]\exp\left(\dfrac{-\Delta t}{\lambda}\right) + (\Delta t)e_{IN}(n)$

FIG. 8

MOD#1 → in eq.3, change $e_{OUT2}$ to $T_{OUT}(n) - T_{SP} + T_{OFF}$

MOD#2 → in $S_{HOT}(n)$, add derivative/intergal term to $e_{OUT1}(n)$

MOD#3 → in $S_{COLD}(n)$, add derivative/intergal term to $e_{OUT2}(n)$

MOD#4 → in $S_{COLD}(n)$, approximate $T_{SP} - T_{CR}(n) \approx T_{SP}$ - constant MOD#5 → change limits of $\pm 3°C$ in eqs 4–5 to other limits MOD#6 → add purge tank(s) to Fig.1

MOD#7 → run entire system at positive pressure

MOD#8 → move temperature sensors TS1, TS2, TS3

MOD#9 → heat exchangers 11–1 thru 11–N contact any type of electrical component

MOD#10 → heat exchangers 21–1 thru 21–N contact any type of electrical component MOD#11 → change radiator 25 to liquid – liquid heat exchanger

SYSTEM FOR REGULATING THE TEMPERATURE OF IC-CHIPS WITH A FLUID WHICH IS HEATED AND COOLED AS A FUNCTION OF THE FLUID TEMPERATURES TO AND FROM HEAT EXCHANGERS FOR THE IC-CHIPS

RELATED CASE

The present invention, as identified by the above title and docket number, is related to another invention which is identified as follows: "SYSTEM FOR REGULATING THE TEMPERATURE OF IC-CHIPS WITH A FLUID WHOSE TEMPERATURE IS CONTROLLED QUICKLY BY A SLOW RESPONSE COOLER AND A FAST RESPONSE HEATER" having U.S. Ser. No. 09/674,784. Patent applications on both of these inventions were filed concurrently on May 19, 2000; and they have one common Detailed Description.

BACKGROUND OF THE INVENTION

The present invention relates to temperature control systems for integrated circuit chips (IC-chips). More particularly, the present invention relates to temperature control systems which circulate a fluid thru heat exchangers that are coupled to the IC-chips such that the temperature of the IC-chips stays within a few degrees of a selectable set point while the IC-chips undergo large step increases and large step decreases in power dissipation as they are tested.

After an IC-chip is initially fabricated, it must be tested in order to determine if all of the circuitry which is in the IC-chip operates properly. This testing is often done via a "burn-in" test wherein the IC-chip is kept above its normal operating temperature while it is sent a series of test signals. Such a burn-in test is performed because it greatly shortens the time period during which certain types of failures will occur within the IC-chip, if those failures are going to occur at all.

In the prior art, the burn-in test usually is performed by the steps of 1) placing multiple IC-chips in sockets on several printed circuit boards, 2) moving the printed circuit boards that are holding the IC-chips into an enclosed tester which has a heater, and 3), blowing hot air from the heater with fans such that the hot air flows across the IC-chips while they are sent the test signals. Such an enclosed tester, with its heater and fans, is relatively inexpensive; however, it has several major limitations.

For example, as the number of transistors within a single IC-chip increases, the maximum amount of electrical power which the IC-chip dissipates also increases. Thus, a point is eventually reached where the maximum variation in power dissipation of multiple IC-chips on several printed circuit boards is simply too large to be regulated by convection with air.

Also, it sometimes is desirable to sequentially test different subsets of the IC-chips which are held on the printed circuit boards; rather than test all of the IC-chips at the same time. But when the number of IC-chips that are being tested changes from a small subset to a large subset, then a large step increase will occur in their total power dissipation. This step increase occurs because the IC-chips that are being sent the test signals dissipate a much larger amount of power than the IC-chips that are not being sent the test signals. Similarly, when the number of IC-chips that are being tested changes from a large subset to a small subset, then a large step decrease in their total power dissipation will occur.

The above step increase and step decrease in power dissipation presents a particularly difficult problem because while the testing occurs, the temperature of the IC-chips needs to be precisely maintained within just a few degrees of a set point temperature. However, when power dissipation of the IC-chips takes a step up, the amount of heat which must be removed from the IC-chips in order to keep their temperature constant increases rapidly. Likewise, when the power dissipation of the IC-chips takes a step down, the amount of heat which must be added to the IC-chips in order to keep their temperature constant decreases rapidly.

Currently in the integrated circuit industry, there is a need for a temperature control system which can maintain the temperature of multiple IC-chips within a few degrees of a set point temperature while their total power dissipation undergoes step increases and step decreases of over twenty-kilowatts. Accordingly, a primary object of the present invention is to provide such a system.

BRIEF SUMMARY OF THE INVENTION

In accordance with the present invention, a system for maintaining the temperature of IC-chips near a set point, while the IC-chips undergo large step increases and large step decreases in power dissipation as they are tested, has the following structure:

1) a hot fluid circuit in which a hot fluid circulates from a reservoir through heat exchangers and back to the reservoir, and in which the heat exchangers transfer heat by conduction between the hot fluid and the IC-chips;
2) an input temperature sensor which generates an input temperature signal that indicates the temperature of the fluid flowing into the heat exchangers;
3) an output temperature sensor which generates an output temperature signal that indicates the temperature of the fluid flowing out of the heat exchangers;
4) an electric heater which adds heat to the fluid returning to the reservoir as a function of both the input temperature signal and the output temperature signal; and,
5) an analog valve which adds a cold fluid to the reservoir as a function of both the input temperature signal and the output temperature signal.

In one mode of operation, the heater adds heat to the fluid that is returning to the reservoir when either one of two conditions occur. The first condition is that the input temperature is less than a selectable set point temperature; and the second condition is that the output temperature is less than the set point temperature. The above addition of heat based on output temperature via the second condition provides a "too cold look ahead" feature which prevents fluid that gets too cold in the heat exchangers from being put back into the reservoir. If fluid which is too cold is put into the reservoir, then the temperature of all of the fluid in the reservoir will need to be corrected; but that is a slow process because the fluid in the reservoir has a large thermal mass.

In another mode of operation, the analog valve adds cold fluid to the reservoir when either one of two conditions occur. The first condition is that the input temperature exceeds the set point temperature; and the second condition is that the output temperature exceeds the input temperature. The addition of cold fluid based on output temperature via the second condition provides a too hot look ahead feature which prevents fluid that gets too hot in the heat exchangers from being put back into the reservoir by itself. Thus, the slow process of cooling all of the fluid in the reservoir is avoided.

Due to the above "too cold look ahead" and "too hot look ahead" features, the temperature of the IC-chips is controlled extremely accurately. In one particular embodiment, the temperature of the fluid which flows into the heat exchangers is held within ±1° C. of a selectable set point temperature $T_{SP}$. Further, this small variation in fluid temperature is achieved while the power dissipation of all of the IC-chips steps up and/or steps down by over twenty-kilowatts.

BRIEF DESCRIPTION OF THE DRAWINGS

FIG. 3 shows a set of equations which specify the internal details of one preferred embodiment of a temperature controller which is in the system of FIG. 1.

FIG. 7 shows how the temperature controller of FIG. 6 can digitally perform a low pass filter function, a derivative function, and an integral function to implement the equations of FIG. 3.

FIG. 8 identifies various changes and modifications that can be made to the preferred embodiment of the system for regulating the temperature of IC-chips which is shown in FIGS. 1–7.

DETAILED DESCRIPTION

Figure 1:
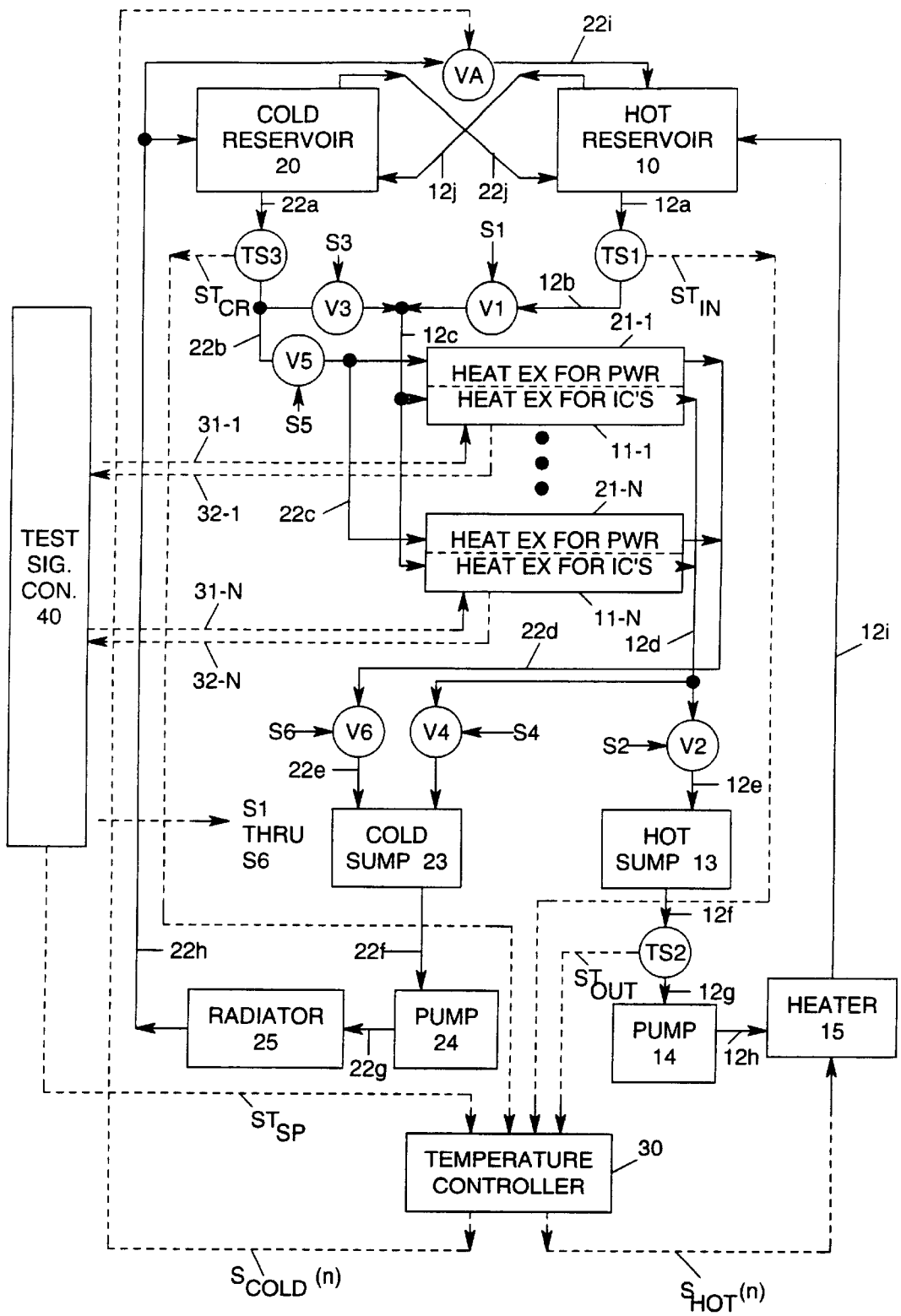
FIG. 1 shows a preferred embodiment of a system for regulating the temperature of IC-chips with a fluid in accordance with the present invention.

With reference now to FIG. 1, the details of a preferred embodiment of the present invention will be described. This FIG. 1 embodiment includes a hot fluid circuit in which a hot fluid circulates from a reservoir 10 into N sets of heat exchangers 11-1 thru 11-N and back to the reservoir. Each of the heat exchangers 11-1 thru 11-N is designed to press against a corresponding set of IC-chips; and that causes heat to be transferred by conduction between the hot fluid and the IC-chips. Consequently, the temperature of the IC-chips becomes approximately equal to the temperature of the hot fluid.

To carry the hot fluid to the heat exchangers 11-1 thru 11-N and back to the reservoir, the hot fluid circuit includes a plurality of conduits 12a–12i which are intercoupled as shown. Coupled between the conduits 12a and 12b is a temperature sensor TS1 that generates a temperature signal $ST_{IN}$ which indicates the temperature of the fluid that is flowing into the heat exchangers 11-1 thru 11-N.

Coupled between the conduits 12b and 12c is a valve V1 which opens and closes respectively in response to the "1" and "0" state of a digital control signal S1. Similarly, coupled between the conduits 12d and 12e is a valve V2 which opens and closes respectively in response to the "1" and "0" state of a digital control signal S2.

Coupled to the output of the valve V2 is a hot sump 13, and coupled to the output of the hot sump is a temperature sensor TS2. This sensor TS2 generates an output signal $ST_{OUT}$ which indicates the temperature of the fluid that is flowing out of the heat exchangers 11-1 thru 11-N.

Coupled to the output of the temperature sensor TS2 is a pump 14, and coupled to the output of the pump is an electric heater 15. The pump 14 sucks the hot fluid from the reservoir 10 through the heat exchangers 11-1 thru 11-N at a negative pressure. Then, the fluid from the pump 14 is forced thru the heater 15 at a positive pressure and returned back to the hot reservoir 10 which is at atmospheric pressure.

Also included in the FIG. 1 embodiment is a cold fluid circuit which circulates a cold fluid from a reservoir 20 into N sets of heat exchangers 21-1 thru 21-N and back to the reservoir. Each of the heat exchangers 21-1 thru 21-N cool a corresponding set of power supplies which supply DC electrical power to the IC-chips.

To carry the cold fluid to the heat exchangers 21-1 thru 21-N and back to the reservoir, the cold fluid circuit includes a plurality of conduits 22a–22h which are intercoupled as shown. Coupled between the conduits 22a and 22b is a temperature sensor TS3 that generates a signal $ST_{CR}$ which indicates the temperature of the fluid that flows out of the cold reservoir 20.

Coupled between the conduits 22b and 22c is a valve V5 which opens and closes respectively in response to the "1" and "0" state of a digital control signal S5. Similarly, coupled between the conduits 22d and 22e is a valve V6 which opens and closes respectively in response to the "1" and "0" state of a digital control signal S6.

Coupled to the output of the valve V6 is a cold sump 23, and coupled to the output of the cold sump is a pump 24. The pump 24 sucks the cold fluid from the reservoir 20 thru the heat exchangers 21-1 thru 21-N at a negative pressure; and then the fluid from the pump 24 is forced through a radiator 25 at a positive pressure and returned back to the cold reservoir 20.

With the cold fluid circuit, the temperature of the power supplies does not need to be controlled very accurately. Instead, the temperature of the power supplies only needs to be kept below a certain maximum operating temperature. This requirement can be met by simply passing the cold fluid thru the radiator 25.

By comparison, with the hot fluid circuit, the temperature of the IC-chips must be controlled extremely accurately. For example, to control the temperature of the IC-chips in one particular embodiment, the temperature of the fluid which flows into the heat exchangers 11-1 thru 11-N must be held within ±1° C. of a selectable set point temperature $T_{SP}$. Further, the above requirement of ±1° C. must be met while the power dissipation of all of the IC-chips steps up and/or steps down by over twenty-kilowatts.

In order to keep the temperature of the fluid which flows into the heat exchangers within ±1° C. of the set point temperature, the FIG. 1 embodiment includes a temperature controller 30. This temperature controller receives four input signals; and in response, it generates two output signals.

Three of the inputs to the temperature controller 30 are the signal $ST_{IN}$ from the temperature sensor TS1, the signal $ST_{OUT}$ from the temperature sensor TS2, and the signal $ST_{CR}$ from the temperature sensor TS3. The fourth input is a signal $ST_{SP}$ which indicates the set point temperature.

The two outputs from the temperature controller 30 are a signal $S_{HOT}(n)$ and a signal $S_{COLD}(n)$. FIG. 3, which will be described shortly, shows a set of equations which state in detail how the output signals are generated as a function of the input signals, in one preferred embodiment of the temperature controller 30.

Output signal $S_{HOT}(n)$ from the temperature controller 30 is sent to the heater 15. That output signal has a magnitude which varies from 0 to 10 volts, and the amount of heat which the heater 15 adds to the fluid that it is passing is proportional to the magnitude of the signal.

Output signal $S_{COLD}(n)$ is sent to an analog valve VA which is coupled to the cold fluid conduit 22h. That output signal has a magnitude which varies from 0 to 10 volts, and the amount of cold fluid which the valve VA passes is proportional to the magnitude of the signal. All of the cold fluid which the valve VA passes is sent through a conduit 22i to the hot reservoir 10.

Since the heater 15 is an electric component with no moving parts, its response time to the signal $S_{HOT}(n)$ is relatively fast. By comparison, since the valve VA has a mechanical part that moves to open and close the valve, its response time to the signal $S_{COLD}(n)$ is relatively slow. However, the slow response of the valve VA is compensated for within the FIG. 1 system in a manner which will be described in detail in conjunction with FIG. 3.

When the hot fluid passes through the heat exchangers 11-1 thru 11-N, the temperature of that fluid increases as the amount of power that is being dissipated by the IC-chips increases. Thus, when the IC-chips dissipate their maximum power, then the temperature of the hot fluid which exits the heat exchangers 11-1 thru 11-N will be raised by a maximum amount above the set point temperature.

Conversely, when the IC-chips dissipate little or no power, then the temperature of the hot fluid which exits the heat exchangers 11-1 thru 11-N can be below the set point temperature. This will occur if the set point exceeds the ambient air temperature and heat is lost in the circulating fluid.

However, by properly generating the signals $S_{HOT}(n)$ and $S_{COLD}(n)$, the temperature of the hot fluid which flows from the hot reservoir 10 into the heat exchangers 11-1 thru 11-N is controlled to stay within $\pm 1°$ C. of the set point temperature. If the temperature of the hot fluid which exits the heat exchangers 11-1 thru 11-N is below the set point, then heat is added to that hot fluid by the heater 15 in response to the output signal $S_{HOT}(n)$. Conversely, if the temperature of the hot fluid which exits the heat exchangers 11-1 thru 11-N is above the set point temperature, then cold fluid is added to the hot reservoir 10 in response to the output signal $S_{COLD}(n)$.

In order to make room in the hot reservoir 10 for the cold fluid from the valve VA, an overflow conduit 12j is provided which couples the top of the hot reservoir 10 to the cold reservoir 20. Any hot fluid that passes through the conduit 12j eventually is passed through the radiator 25; and that removes the excess heat that was generated by the IC-chips. Similarly, another overflow conduit 22j is provided which couples the top of the cold reservoir 20 to the hot reservoir 10.

Also included in the FIG. 1 embodiment is a test signal controller 40. In operation, the test signal controller 40 sends test signals on conductors 31-1 thru 31-N which test the IC-chips. In addition, the test signal controller 40 receives output signals on conductors 32-1 thru 32-N as a response from the IC-chips that are being tested.

Also the test signal controller 40 generates the signals S1 thru S6 which open and close the valves V1 thru V6. In addition, the test signal controller 40 generates the signal $ST_{SP}$ which specifies the set point temperature at which the chips are to be tested.

For purposes of the present invention, any internal structure for the test signal controller 40 can be used. Thus the test signal controller 40 can be any controller which is capable of performing the above tasks, such as a general purpose digital computer.

Figure 2:
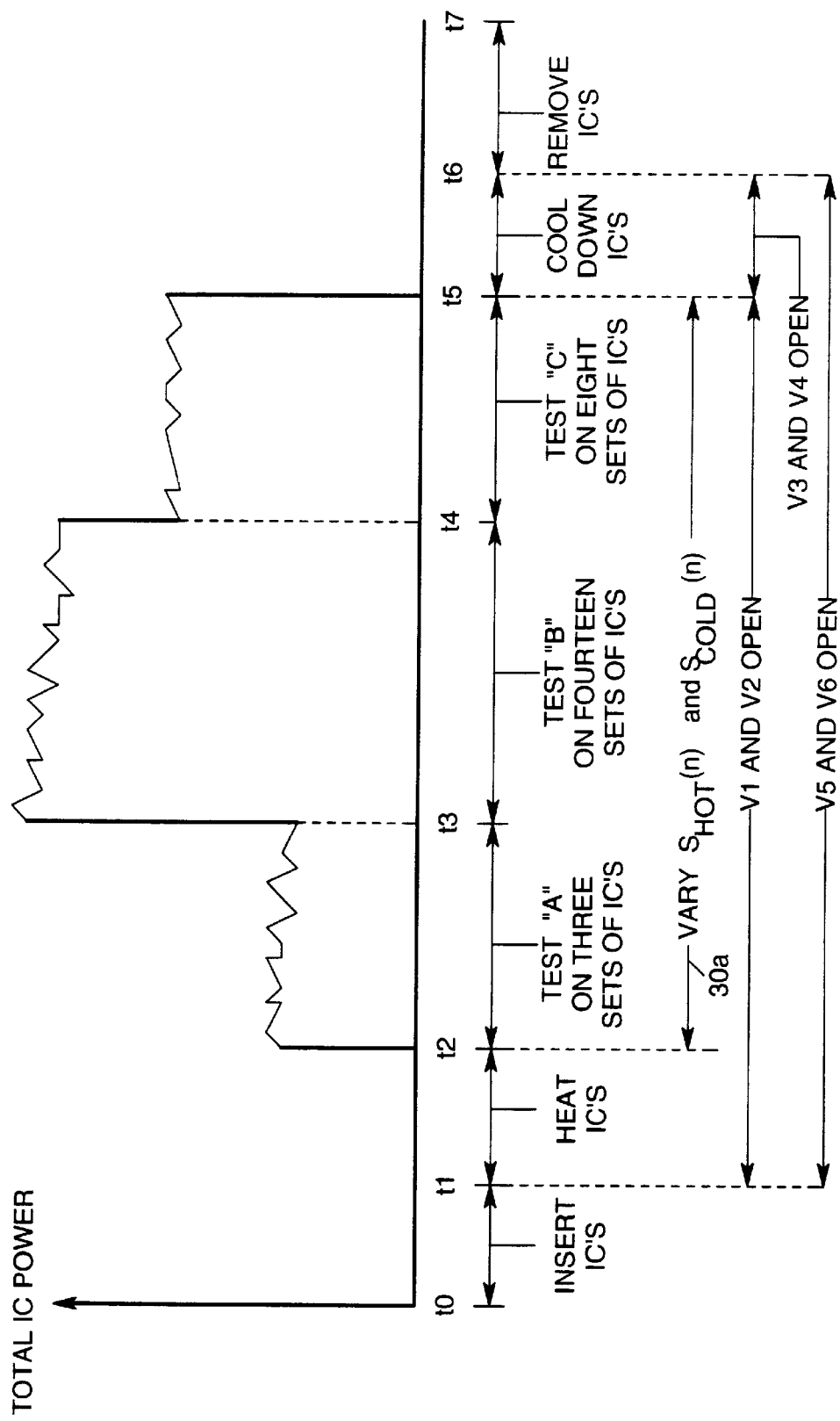
FIG. 2 shows an example of the overall time sequence by which the system of FIG. 1 operates.

Referring now to FIG. 2, an example will be described that illustrates the overall time sequence by which the FIG. 1 system operates. Initially, between time t0 and time t1, the IC-chips which are to be tested are inserted into the FIG. 1 system and placed in contact with the heat exchangers 11-1 thru 11-N.

Then, at time t1, the valves V1, V2, V5 and V6 are opened. This causes the hot fluid to flow through the heat exchangers 11-1 thru 11-N, and it causes the cold fluid to flow through the heat exchangers 21-1 thru 21-N.

From time t1 to time t2, no test signals are sent to the IC-chips via the conductors 31-1 thru 31-N. Thus, from time t1 to time t2, the total power dissipation of all of the IC-chips is approximately zero and the IC-chips are heated by the hot fluid to the set point temperature.

Thereafter, from t2 to time t3, three sets of the IC-chips are subjected to a "test A" by sending a particular sequence of test signals on the conductors 31-1 thru 31-N. Then from time t3 to time t4, fourteen sets of the IC-chips are subjected to a "test B" by sending a second sequence of test signals on the conductors 31-1 thru 31-N. Then from time t4 to time t5, eight sets of the IC-chips are subjected to a "test C" by sending a third sequence of test signals on the conductors 31-1 thru 31-N.

Each time the number of IC-chips that are being tested increases, a step increase occurs in the total power which the IC-chips dissipate. Thus a step increase in the total IC-chip power dissipation occurs at time t2 and at time t3.

Conversely, each time the number of IC-chips that are being tested decreases, a step decrease occurs in the total power which the IC-chips dissipate. Thus a step decrease occurs at time t4 and at time t5.

Throughout the chip testing sequence which occurs from time t2 to time t5, the temperature of the fluid in the hot reservoir 10 must be maintained within $\pm 1°$ C. of the set point temperature. This is achieved in the FIG. 1 system via the temperature controller 30 by varying the two output signals $S_{HOT}(n)$ and $S_{COLD}(n)$, and this is indicated in FIG. 2 by reference numeral 30a.

When the testing of the IC-chips is complete, they are rapidly cooled-down from time t5 to time t6 so that they can be removed from the heat exchangers 11-1 thru 11-N and replaced with other IC-chips. This rapid cool-down is achieved by opening the valves V3 and V4, and closing the valves V1 and V2. As a result, cold fluid is passed from the cold reservoir 20 through the heat exchangers 11-1 thru 11-N. Thereafter, from time t6 to time t7, the IC-chips are removed and the entire time sequence can be repeated starting at time t0.

Next, with reference to FIG. 3, the internal details of one preferred embodiment of the temperature controller 30 will be described. This temperature controller 30 receives the four input signals $ST_{IN}$, $ST_{OUT}$, $ST_{CR}$, and $T_{SP}$; and in response, it generates the two output signals $S_{HOT}(n)$ and $S_{COLD}(n)$ as stated by equation 1 thru equation 6 of FIG. 3.

Equation 1 specifies an error $e_{IN}(n)$ in the temperature of the fluid which flows into the heat exchangers 11-1 thru 11-N. This error $e_{IN}(n)$ is calculated internally within the temperature controller 30 by sampling and low-pass filtering the signal $ST_{IN}$, to obtain the result $T_{IN}(n)$; and then the set point temperature $T_{SP}$ is subtracted from $T_{IN}(n)$. Here, the filtering removes any high frequency noise which may be generated by the temperature sensor TS1.

Equation 2 specifies an error $e_{OUT1}(n)$ in the temperature of the fluid which flows out of the heat exchangers 11-1 thru 11-N. This error $e_{OUT1}(n)$ is calculated internally within the temperature controller 30 by sampling and low-pass filtering the signal $S_{OUT}$, to obtain the result $T_{OUT}(n)$; and then the set point temperature $T_{SP}$ is subtracted from $T_{OUT}(n)$. Here, the filtering removes any high frequency noise which may be generated by the temperature sensor TS2.

Equation 3 specifies another error $e_{OUT2}(n)$ in the temperature of the fluid which flows out of the heat exchangers 11-1 thru 11-N. This error $e_{OUT2}(n)$ is calculated internally within the temperature controller 30 by subtracting $T_{IN}(n)$ from $T_{OUT}(n)$ and adding an offset $T_{OFF}$ to the result.

When the error $e_{IN}(n)$ is negative and larger in magnitude then 3° C., then the heater 15 generates heat with its maximum power and the valve VA is closed. This mode of operation is stated by equation 4 where the output signal $S_{HOT}(n)$ is generated as ten volts and the output signal $S_{COLD}(n)$ is generated as zero volts.

When the error signal $e_{IN}(n)$ is positive and larger in magnitude then 3° C., then the valve VA is opened fully and the heater 15 is turned off. This mode of operation is stated by equation 5 where the output signal $S_{COLD}(n)$ is generated as ten volts and the output signal $S_{HOT}(n)$ is generated as zero volts.

When the error $e_{IN}(n)$ is from −3° C. to +3° C., then the output signals $S_{HOT}(n)$ and $S_{COLD}(n)$ are generated as stated by equation 6. There, the output signals are functions of the three error terms $e_{IN}(n)$, $e_{OUT1}(n)$, and $e_{OUT2}(n)$ and several parameters which is defined below in TABLE 1.

$q_{max}$ - maximum heater power (kW)
$QC_{max}$ - maximum cold flow into hot tanks (gpm)
$Q_{max}$ - maximum hot side flow rate (gpm)
Tsp - set point temperature (° C.)
Kp - proportional gain (kW/° C.)
Kd - derivative gain ratio(s)
Ki - integral gain ratio (1/s)
ρ - fluid density (kg/m)
Cp - fluid specific heat (J/kg/° C.)
Δt - time between two successive samples(s)

With equation 6, each of the output signals $S_{HOT}(n)$ and $S_{COLD}(n)$ is limited to a minimum value of zero volts and a maximum value of ten volts. Thus, if the sum of all of the terms in the expression 51 for the signal $S_{HOT}(n)$ is a negative number, then the actual value of the signal $S_{HOT}(n)$ is zero volts. Similarly, if the expression 52 for the signal $S_{COLD}(n)$ is negative, then the actual value of the signal $S_{COLD}(n)$ is zero volts. Likewise, if the expression 51 or 52 exceeds ten, then the actual value of the corresponding signal is ten volts.

Expression 51 contains a term $Kp(e_{IN}(n))$ and a term $\rho CpQmax(e_{OUT1}(n))$. Due to the above first term, the heater 15 adds heat to the fluid that is returning to the reservoir 10 when the set point temperature exceeds the temperature of the fluid that is flowing into the heat exchangers 11-1 thru 11-N. Due to the above second term, the heater 15 adds heat to the fluid that is returning to the reservoir 10 when the set point temperature exceeds the temperature of the fluid that is flowing out of the heat exchangers 11-1 thru 11-N.

The above second term provides a "too cold look ahead" feature. This feature is very useful because it prevents fluid which is too cold from being put back into the hot reservoir 10. If fluid which is too cold is put into the hot reservoir 10, then the temperature of all of the fluid in the reservoir 10 will need to be corrected. But, correcting the temperature of all of the fluid in the hot reservoir 10 is a slow process because that fluid has a large thermal mass.

Preferably, the amount of fluid in the hot reservoir 10 is at least one liter for every fifty IC-chips that are contacted by the heat exchangers 11-1 thru 11-N. Also, one preferred fluid is a silicone oil. Thus, for example, with a thirty liter silicone oil system, the thermal mass of the fluid in the reservoir 10 is over forty kilojoules per 0° C.

Similarly, expression 52 contains a term $Kp(e_{IN}N(n))$ and a term $\rho CpQmax(e_{OUT2}(n))$. Due to the above first term, the valve VA adds cold fluid to the reservoir 10 when the temperature of the fluid that is flowing into the heat exchangers 10-1 thru 10-N exceeds the set point temperature. Due to the above second term, the value VA adds cold fluid to the hot reservoir 10 when the temperature of the fluid that is flowing out of the heat exchangers 11-1 thru 11-N exceeds the temperature of the fluid that is flowing into the heat exchangers.

The above second term provides a "too hot look ahead" feature which prevents fluid that is too hot from being put back into the hot reservoir 10. If fluid which is too hot is put into the hot reservoir 10, then the temperature of all of the fluid in the hot reservoir will need to be cooled; and that is a slow process because the fluid in the hot reservoir has a large thermal mass.

Also due to expressions 51 and 52 in equation 6, both of the signals $S_{HOT}(n)$ and $S_{COLD}(n)$ can have positive values simultaneously. When that occurs, heat is added by the heater 15 to the fluid which is being returned to the hot reservoir 10; and, cold fluid is simultaneously passed through the valve VA into the hot reservoir 10. To increase the amount of cold fluid which passes thru the valve VA while heat is being added by the heater 15, the offset term $T_{OFF}$ in equation 3 is increased.

One feature of the above simultaneous mode of operation is that the value VA can react slowly to the output signal $S_{COLD}(n)$; and at the same time, a rapid cooling effect can be achieved by the sum of the hot and cold fluid which enters the hot reservoir 10 from the value VA and the heater 15. To achieve this rapid cooling, the heating power of the heater 15 is reduced quickly via the output signal $S_{HOT}(n)$ while the flow of cold fluid through the value VA increases slowly or even stays constant.

This feature of a rapid cooling effect is desirable because the valve VA is a mechanical component whose speed of operation is inherently limited by mechanical inertia. As a minimum, the response time of the heater 15 is at least twice as fast as the response time of the valve VA; and typically, the heater 15 operates at least ten times faster than the valve VA. This rapid cooling effect is used when the IC-chips that are being tested undergo a large step increase in power dissipation and thereby cause a rapid increase in the temperature of the fluid from the heat exchangers 11-1 thru 11-N.

Next, with reference to FIGS. 4A–4C, a computer simulation of the system of FIGS. 1–3 will be described. In this simulation, each of the heat exchangers 11-1 thru 11-N made contact with a respective set of six IC-chips; and, each heat exchanger carried fluid from the hot reservoir 10 past its respective six IC-chips in a series.

Also in this simulation, a random number generator was used to introduce noise into the signals from the temperature sensors TS1-TS3, and digital low-pass filters were used to remove the noise. All of the parameters which were used in this simulation are shown below in Table 2.

TABLE 2

| | |
|---|---|
| $q_{max}$ = 24 kW | $K_p$ = 4 kW/° C. |
| $QC_{max}$ = 8 gpm | $K_d$ = 12 sec. |
| $Q_{max}$ = 67 gpm | $K_i$ = 0.4/sec. |
| $T_{sp}$ = 110° C. | $\rho$ = 1700 kg/m³ |
| $\Delta t$ = 0.025 sec. | $C_p$ = 855 J/kg/° C. |
| $\lambda$ = 8 sec | N = 140 |

From time t=0 to t=150 seconds in the above simulation, the power dissipation of all of the chips was zero. Then at time t=150 seconds, the power dissipation of each IC-chip made a step increase from zero to thirty watts. Thereafter, the power dissipation of the IC-chips then did not change until time t=350 seconds, at which time it made a step decrease back to zero watts.

Figure 4A:
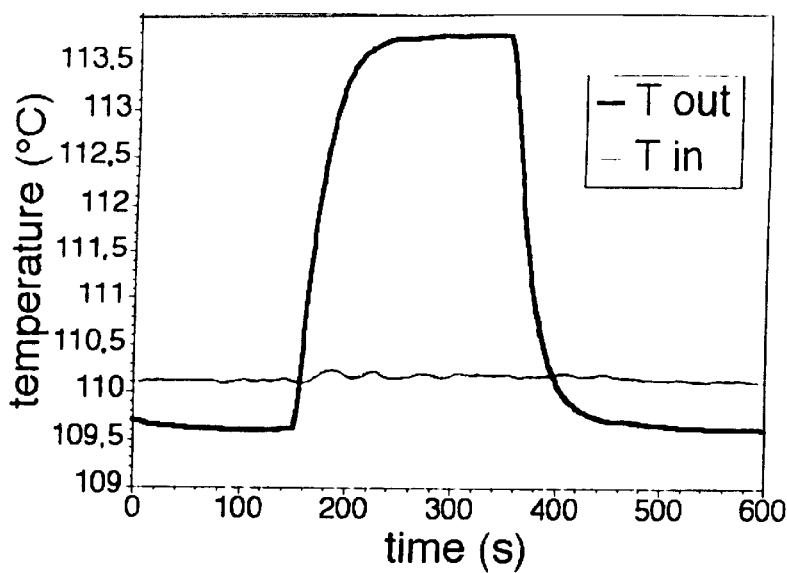
FIGS. 4A–4C show the results of a computer simulation of how the system of FIG. 1 operates.

In FIG. 4A, the temperature of the fluid which is flowing into the heat exchangers 11-1 thru 11-N is shown by the plot of $T_{IN}$. Also in FIG. 4A, the temperature of the fluid that is flowing out of the heat exchangers 11-1 thru 11-N is shown by the plot of $T_{OUT}$.

Figure 4B:
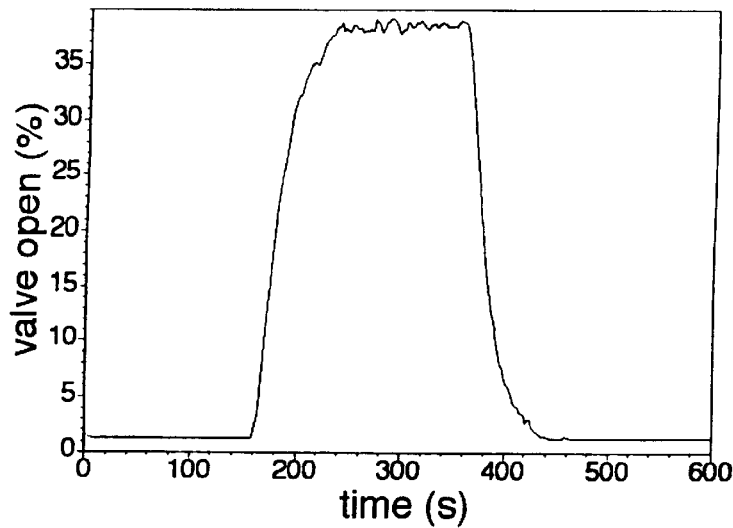
Figure 4C:
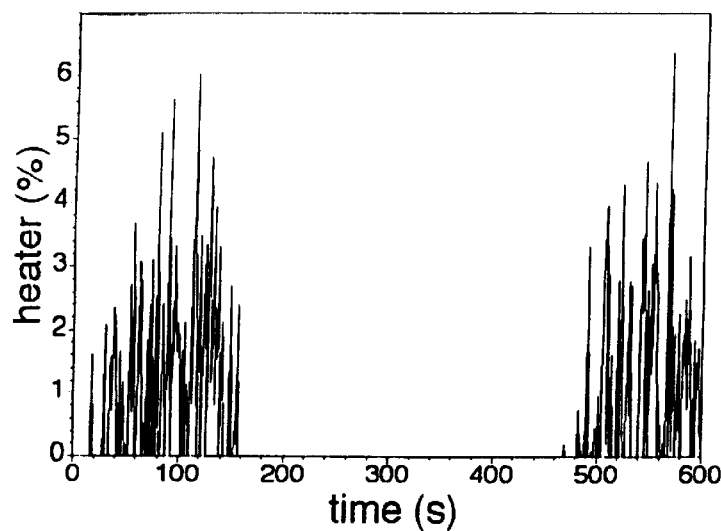

In FIG. 4B, the amount by which the value VA is open is shown as a percentage of being fully open. Similarly in FIG. 4C, the amount by which the heater 15 is on is shown as a percentage of being fully on. Both of the FIGS. 4B and 4C are generated from equations 1–6 of FIG. 3.

Due to the power increase which occurs at t=150 seconds, the temperature of the fluid which flows out of the heat exchangers 11-1 thru 11-N rapidly increases, and this is shown by the plot of $T_{OUT}$ in FIG. 4A. However, while the temperature of the fluid that is flowing out of the heat exchangers 11-1 thru 11-N is rapidly increasing, the temperature of the fluid which is flowing into the heat exchangers stays essentially constant as is shown by the plot of $T_{IN}$ in FIG. 4A. This result is achieved by varying the cold fluid through valve VA and varying the heat from the heater 15 as shown in FIGS. 4B and 4C from time t=150 seconds to t=350 seconds.

Due to the power decrease which occurs at t=350 seconds, the temperature of the fluid which flows out of the heat exchangers 11-1 thru 11-N rapidly decreases, and this is shown by the plot of $T_{OUT}$. However, while the temperature of the fluid that is flowing out of the heat exchangers 11-1 thru 11-N is rapidly decreasing, the temperature of the fluid which is flowing into the heat exchangers stays essentially constant as is shown by the plot of $T_{IN}$ in FIG. 4A. This result is achieved by varying the cold fluid through valve VA and varying the heat from the heater 15 as shown in FIGS. 4B and 4C from time t=350 seconds to time t=450 seconds.

Figure 5:
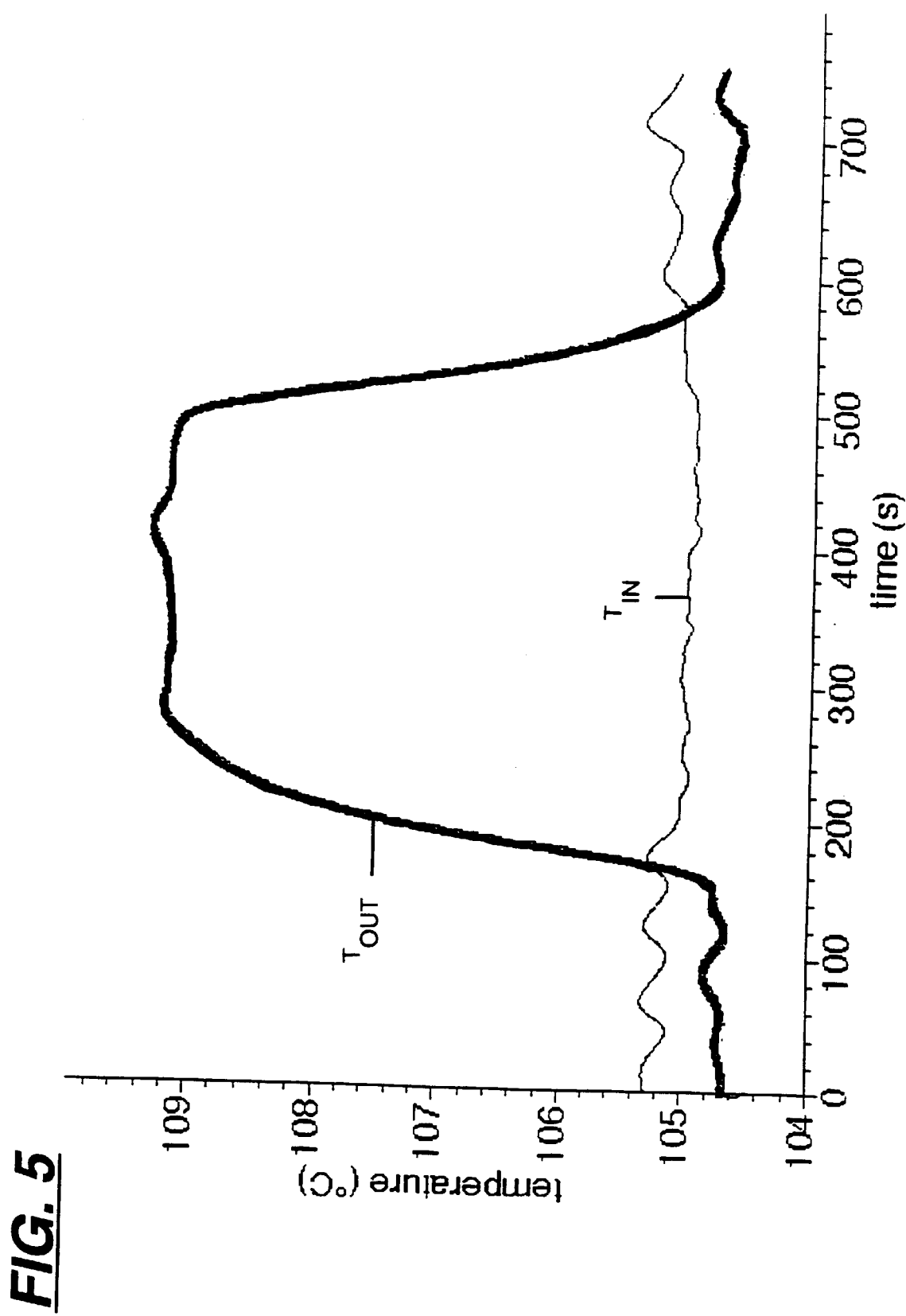
FIG. 5 shows a set of curves which illustrate certain temperature measurements that were obtained from the system of FIGS. 1–3 which was actually built.

Referring now to FIG. 5, it shows the temperature measurements that were obtained from the system of FIGS. 1–3 which was actually built. In this system, each of the heat exchangers 11-1 thru 11-N made contact with a respective set of six IC-chips; and, each heat exchanger carried fluid from the hot reservoir 10 past its respective six chips in a series. All of the parameters for this actual system are the same as shown in Table 2 with the one exception that $T_{SP}$ equals 105° C. rather than 110° C.

In FIG. 5, the temperature of the fluid which is flowing into the heat exchangers 11-1 thru 11-N is shown by a curve that is labeled $T_{IN}$. Also in FIG. 5, the temperature of the fluid that is flowing out of the heat exchangers 11-1 thru 11-N is shown by a curve that is labeled $T_{OUT}$.

From time t=0 to t=150 seconds in FIG. 5, the total power dissipation of all of the IC-chips is zero watts. Then at time t=150 seconds, the total power dissipation of all of the IC-chips makes a step increase from zero to 26.2 kilowatts. Thereafter, the total power dissipation of all of the IC-chips stays at 26.2 kilowatts until time t=500 seconds, at which time it makes a step decrease back to zero watts.

Inspection of the curve $T_{IN}$ in FIG. 5 shows that the temperature of the fluid flowing into the heat exchangers 11-1 thru 11-N varies from time t=0 to t=700 seconds by only ±0.2° C. This is an amazing result since FIG. 5 also shows that the temperature $T_{OUT}$ increases rapidly by over 4° C. starting at time t=150 seconds, and decreases rapidly by over 4° C. starting at time t=500 seconds.

Next, with reference to FIG. 6, one preferred internal structure of the temperature controller 30 will be described. This particular internal structure includes several components 51a–55 which are identified as follows.

Components 51a–51c are sample-and-hold circuits. Components 52a–52c are analog to digital converters. Components 53a–53c are digital low pass filters. Components 54a–54c are digital subtractors. Component 55 is a digital circuit which performs the arithmetic operations that are defined by the previously-described equations 4–6 of FIG. 3.

In operation, the temperature signals $ST_{IN}$, $ST_{OUT}$, and $ST_{CR}$ are respectively sampled by the components 51a, 51b, and 51c. Those samples are then converted from analog samples to digital samples by the components 52a, 52b, and 52c. Thereafter, the digital samples are sent through the low pass filters 53a, 53b, and 53c to thereby generate the sampled and filtered temperature signals $T_{IN}(n)$, $T_{OUT}(n)$ and $T_{CR}(n)$.

Components 54a, 54b, and 54c respectively generate the error signals $e_{IN}(n)$, $e_{OUT1}(n)$ and $e_{OUT2}(n)$. This is done in accordance with equations 1, 2 and 3 of FIG. 3. Then, the error signals are operated on by the digital arithmetic circuit 55 to thereby generate the heater control signal $S_{HOT}(n)$ and the analog valve control signal $S_{COLD}(n)$ in accordance with equations 4–6 of FIG. 3.

Next, with reference to equation 10 of FIG. 7, one embodiment of the low pass filters 53a–53c will be described. In equation 10, an expression is given on the right-hand side of the equal sign for low pass filtering any signal "A" which is digitally sampled. In equation 10, the terms A(n), A(n−1), etc., represent successive samples of the signal "A"; and the term $A_F(n)$ represents the filtered result. Also in equation 10, the term "$\Delta t$" is the time interval between success of samples, and the term "$\tau$" is the time constant of the filter.

Figure 6:
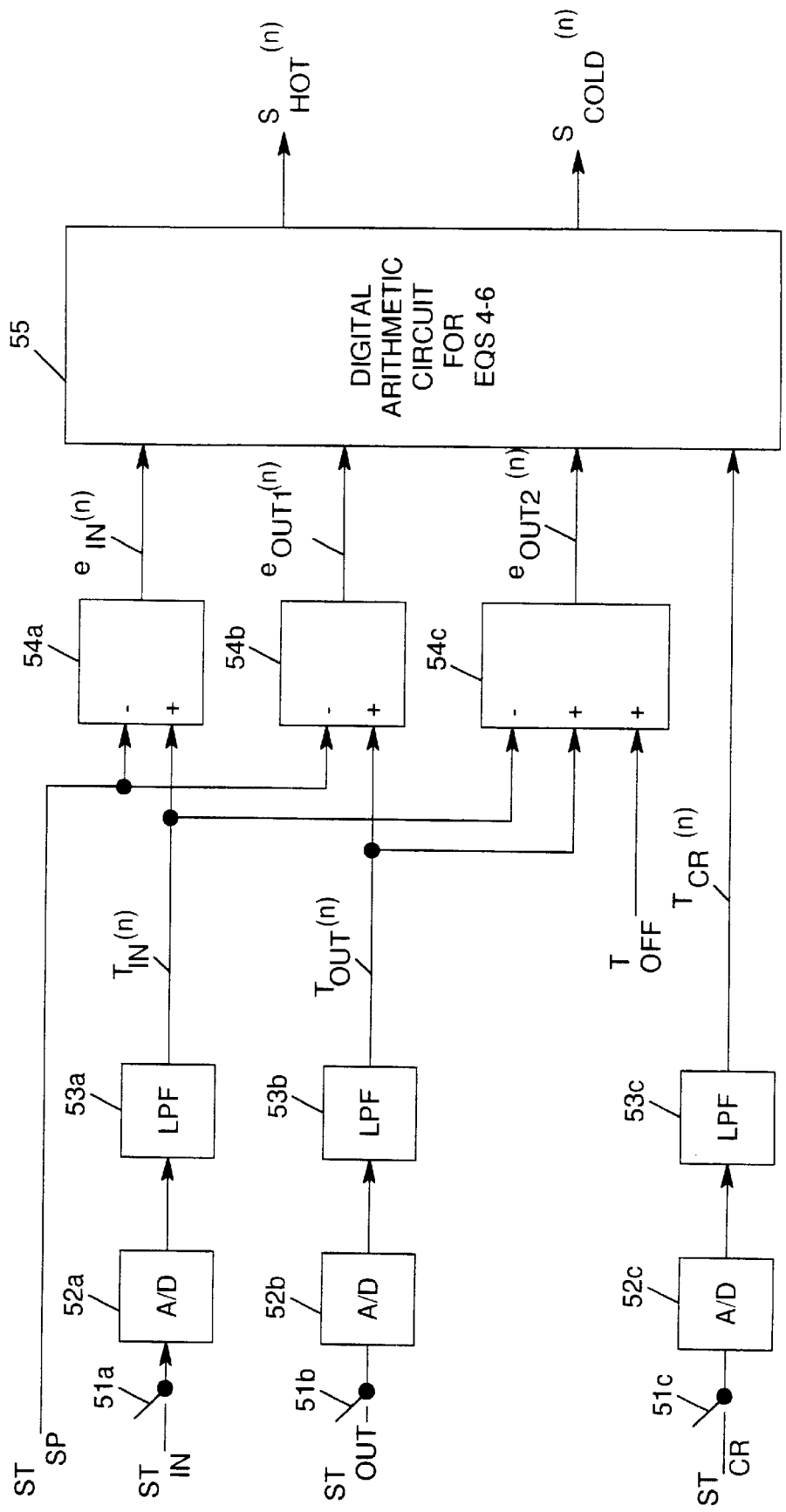
FIG. 6 shows the internal structure of one preferred embodiment of a temperature controller which is in the system of FIG. 1.

FIG. 7 further shows an equation 11 and an equation 12 which respectively are used to implement the derivative function and the interval function within the digital arithmetic circuit 55 of FIG. 6. In equations 11 and 12, the terms $e_{IN}(n)$, $e_{IN}(n−1)$, etc., represent success of samples of the signal "$e_{IN}$" whose derivative and integral are to be generated. Also in equations 11 and 12, the term $\Delta t$ is the time between successive samples, and the term "$\lambda$" is an exponential decay constant which is used to eliminate long term integral error.

One preferred embodiment of the present invention has now been described in detail in conjunction with FIGS. 1–7. In addition however, various changes and modifications can be made to that preferred embodiment; and some of those changes will now be described in conjunction with FIG. 8.

As one modification, equation 3 of FIG. 3 can be changed such that the term $T_{IN}(n)$ is replaced with the term $T_{SP}$. This change is identified in FIG. 8 as Mod #1.

As another modification, equation 6 of FIG. 3 can be changed such that the expression for the signal $S_{HOT}(n)$ includes terms which are the derivative and/or integral of the error $e_{OUT}(n)$. This change is indicated in FIG. 8 as Mod #2.

Similarly, as another change to equation 6 of FIG. 3, the expression for the signal $S_{COLD}(n)$ can be changed to include terms which are the derivative and/or integral of the error $e_{OUT2}(n)$. This change is identified in FIG. 8 as Mod #3.

Also, as another modification, equation 6 of FIG. 3 can be changed such that in the expression for the signal $S_{COLD}(n)$, the denominator term of $T_{SP}-T_{CR}(n)$ is replaced with $T_{SP}$ minus a constant. In FIG. 8, this change is indicated as Mod #4.

As a further modification, equations 3 and 4 of FIG. 3 can be changed such that the limits of −3° C. and +3° C. are any other desired limits. In FIG. 8, this change is indicated as Mod #5.

As another modification, a purging mechanism can be added into the hot fluid circuit and/or into the cold fluid circuit of FIG. 1. Such a purging mechanism would remove air bubbles from the fluid (which will occur if the hot fluid circuit or the cold fluid circuit somehow develops an air leak). One example of such a purging mechanism is described in U.S. Pat. No. 5,048,599 which is assigned to the assignee of the present invention. In FIG. 8, this change is indicated as Mod #6.

As another modification, the hot fluid circuit and/or the cold fluid circuit of the FIG. 1 system can be run only at a positive pressure. This is achieved by moving the location of the pump 14 to the output of the hot reservoir 10, and/or moving the location of the pump 24 to the output of the cold fluid reservoir 20. In FIG. 8, this change is indicated as Mod #7.

As still another modification, the location of one or more of the temperature sensors TS1, TS2, and TS3 can be changed. For example, the sensor TS1 can be moved to the output of the valve V1; the sensor TS2 can be moved to the input of the valve V2; and the sensor TS3 can be moved to the input of the cold reservoir 20. In FIG. 8, this change is indicated as mod #8.

As yet another modification, the heat exchangers 11-1 thru 11-N can be used to regulate the temperature of any type of electrical components, instead of only IC-chips. Further, when the heat exchangers 11-1 thru 11-N do regulate the temperature of IC-chips, those IC-chips can be incorporated into any type of IC-package or they can be in no package at all. In FIG. 8, this change is indicated as Mod #9.

Similarly, in the FIG. 1 system, the heat exchangers 21-1 thru 21-N can be used to cool any type of electrical components, and not just power supplies. In FIG. 8, this change is identified as Mod #10.

Further in the FIG. 1 system, the radiator 25 can be replaced with any mechanism that extracts heat from the cold fluid. For example, the radiator 25 can be replaced with a liquid-to-liquid heat exchanger. In FIG. 8, this change is indicated as Mod #11.

As still another modification, the heat exchangers 11-1 thru 11-N which contact the IC-chips can have any desired structure. Preferably, for each IC-chip that is contacted, the heat exchangers 11-1 thru 11-N include a separate jacket which has a face that moves such that it mates with a corresponding face on the IC-chip even when the orientation of the IC-chip varies. One example of such a structure is shown in U.S. Pat. No. 4,809,134 where each of the items 12a is a moveable jacket for a separate IC-chip. Likewise, each of the heat exchangers 21-1 thru 21-N can also have any desired structure.

As yet another modification, the step changes in power dissipation for the IC-chips that are being tested can occur in many sequences other than those which are illustrated in FIG. 2. For example, a step increase in power dissipation can be caused entirely by a change from a test "X" to a test "Y" while the number of IC-chips that are being tested remains constant. Similarly, a step decrease in power dissipation can be caused entirely by a change from a test "Y" to a test "Z" while the number of IC-chips that are being tested remains constant.

Further, as another modification, the feature of obtaining a rapid cooling effect with the valve VA which has the slow response time and the heater 15 which has the fast response time can be achieved even when only a single temperature is sensed in the hot fluid circuit of FIG. 1. For example, this rapid cooling effect can be achieved by eliminating the temperature sensor TS2 in FIG. 1 and changing equation 2 in FIG. 3 such that it equals equation 3. With this modification, the heating power of the heater 15 will still be reduced quickly by the output signal $S_{HOT}(n)$ while the flow of cold fluid through the valve VA varies slowly or stays constant.

In view of all of the above modifications, it is to be understood that the present invention is not limited to the details of the preferred embodiment of FIGS. 1–7, but is defined by the appended claims.

What is claimed is:

1. A temperature control system, comprising:

a reservoir that is holding a hot fluid; a heat exchanger adapted to contact an electronic component, said heat exchanges being coupled to an input conduit that carries said hot fluid from said reservoir into said heat exchanger; and an output conduit which is coupled to said heat exchanger, said output conduct carrying said hot fluid from said heat exchanger back to said reservoir;

a first sensor, coupled to said input conduit, having a signal terminal which generates an input temperature signal that indicates the temperature of said hot fluid flowing into said heat exchanger;

a second sensor, coupled to said output conduit, having a signal terminal which generates an output temperature signal that indicates the temperature of said hot fluid flowing out of said heat exchanger;

a heater, coupled to said output conduit, having a control input that receives a heater control signal and, in response thereto, adds heat to said hot fluid that is returning back to said reservoir in said output conduit;

a cooler, coupled to said reservoir, having a control input that receives a cooler control signal and, in response thereto, adds a cold fluid to said hot fluid in said reservoir; and, a temperature controller having input terminals that receive said input temperature signal and said output temperature signal, and having an electronic circuit that generates said heater control signal and said cooler control signal as respective functions of both said temperature of said hot fluid flowing into said heat exchanger and said temperature of said hot fluid flowing out of said heat exchanger.

2. A system according to claim 1 wherein said heater control signal directs said heater to add said heat to said fluid returning to said reservoir when a set point exceeds said temperature of said fluid flowing into said heat exchanger, and when said set point exceeds said temperature of said fluid flowing out of said heat exchanger.

3. A system according to claim 1 wherein said cooler control signal directs said cooler to add said cold fluid to said reservoir when said temperature of said fluid flowing into said heat exchanger exceeds a set point, and when said temperature of said fluid flowing out of said heat exchanger exceeds said temperature of said fluid flowing into said heat exchanger.

4. A system according to claim 1 wherein said cooler control signal directs said cooler to add said cold fluid to said reservoir when said temperature of said fluid flowing into said heat exchanger exceeds a set point, and when said temperature of said fluid flowing out of said heat exchanger exceeds said set point.

5. A system according to claim 1 wherein said heater control signal directs said heater to add said heat to said fluid returning to said reservoir, and said cooler control signal directs said cooler to add said cold fluid to said reservoir, in three operating modes which are selected based on the value of said temperature of said fluid flowing into said heat exchanger relative to a set point.

6. A system according to claim 1 wherein said heater control signal directs said heater to add said heat to said fluid returning to said reservoir in proportion to the magnitude of $K_1 e_{OUT1}$ plus $K_2 e_{IN}$ plus $K_3 d(e_{IN})/dt$ plus $K_4 \int e_{IN}$ and said cooler control signal directs said cooler to add said cold fluid to said reservoir in proportion to the magnitude of $K_5 e_{OUT2}$ plus $K_6 e_{IN}$ plus $K_7 d(e_{IN})/dt$ plus $K_8 \int e_{IN}$; where $e_{IN}$ is an error in said input temperature, $e_{OUT1}$ and $e_{OUT2}$ are respective errors in said output temperatures, and $K_1$ thru $K_8$ are constants.

7. A system according to claim 1 which further includes rapid cool-down valves, coupled to said hot fluid circuit, which receives electrical control signals and in response a) blocks the flow of said hot fluid into said heat exchanger and from said heat exchanger back to said reservoir, and, b) passes said cold fluid through said heat exchanger while the flow of said hot fluid is blocked.

8. A system according to claim 1 wherein said cooler includes a cold fluid circuit which operates in parallel with said hot fluid circuit to maintain said cold fluid at a cold temperature.

9. A system according to claim 1 wherein said heater responds to said heater control signal with a fast response time; said cooler responds to said cooler control signal with a slow response time; and to compensate for said slow response time, said cooler control signal directs said cooler to add said cold fluid to said reservoir while said heater control signal directs said heater to concurrently add varying amounts of heat to said fluid returning to said reservoir.

10. A system according to claim 1 wherein said heat exchanger includes a jacket which has a face that moves and can mate with a corresponding face on packaged integrated circuit chips.

11. A system according to claim 1 wherein said heat exchanger includes a jacket which has a face that moves and can mate with a corresponding face on unpackaged integrated circuit chips.

* * * * *